United States Patent

[11] 3,599,083

[72] Inventor Per Bugge-Asperheim
Guldbergs vei 5, Oslo 3, Norway

[21] Appl. No. 847,064
[22] Filed Aug. 4, 1969
[45] Patented Aug. 10, 1971
[32] Priority Aug. 5, 1968
[33] Norway
[31] 3073/68

[54] SWITCHING MEANS FOR THE REGULATION OF A DC VOLTAGE
5 Claims, 4 Drawing Figs.

[52] U.S. Cl. .......... 323/22 T, 323/38
[51] Int. Cl. .......... G05f 1/56
[50] Field of Search .......... 323/18, 22 T, 38, DIG. 1; 307/297

[56] References Cited

UNITED STATES PATENTS 2,945,174 7/1960 Hetzler .......... 323/22 (T)
3,179,874 4/1965 Guennou .......... 323/22 X (T)

FOREIGN PATENTS 1,396,759 3/1965 France .......... 323/22 (T)

*Primary Examiner*—J. D. Miller
*Assistant Examiner*—A. D. Pellinen
*Attorney*—Watson, Cole, Grindle and Watson

ABSTRACT: A pulse-duration modulated voltage regulator, wherein improved efficiency is achieved by stabilizing the emitter-to-collector voltage of the driver transistor by means of a parallel connection of an inductance and a rectifier diode in series with the switching transistor and the emitter-collector terminals of the driver transistor are serially connected with a load resistor connected across the above series connection. Greater efficiency and increased reliability are obtained by minimizing the transition time needed for transferring the switching transistor from its conducting to its nonconducting state by means of a double control process, which renders the driver transistor nonconducting and short circuits its load resistance when the switching transistor is to be made nonconductive, and to perform the reverse process when the switching transistor is to be made conductive. The actuation of the driver transistor is preferably performed before the short- and open-circuiting of the load resistor, respectively.

INVENTOR
Per Bugge-Asperheim
BY
Watson, Cole, Grindle & Watson
ATTORNEYS

SWITCHING MEANS FOR THE REGULATION OF A DC VOLTAGE

The present invention relates to switching means for the regulation of a DC voltage between a pair of output terminals, and comprising at least one switching transistor connected between said terminals and an unregulated low voltage DC source, said switching transistor being alternatively made conducting or nonconducting by means of a driver transistor. The driver transistor is supplied with current from said DC source and series-connected with a load resistor inserted in the input circuit of said switching transistor, whereby said driver transistor is actuated by a control device operative to emit control pulses in dependence of possible voltage variations between said output terminals.

Such switching means are primarily applied in pulse-duration modulated voltage type regulation, e.g. in connection with a low voltage current source regulated to provide a constant output voltage, as indicated in FIG. 1 of the accompanying drawing.

An unregulated, often highly varying voltage source, is rapidly connected to and disconnected from a filtering network under the control of the deviations of the regulated voltage from a reference voltage level and at such a switching rate that said deviations are maintained within predetermined limits.

Regulated voltage sources of this kind are often utilized as power supplies for integrated active circuits, e.g. in data processing systems, where large numbers of semiconductor components are to be supplied with current from a low voltage source. Under these circumstances, it is of great importance to keep the power losses of the switching means as low as possible, as the present voltage sources conveniently are made very compact, and the associated semiconductor components react disadvantageously to even a slight temperature rise.

In some conventional embodiments of such switching means, as shown in FIG. 1, unnecessary losses will arise e.g. in the resistor R which is inserted to bias the driver transistor Q2 to correct the collector voltage.

These losses are partly avoided in the improved means shown in FIG. 2, by biasing the driver transistor to the correct collector voltage by means of an essentially lossless component, as the inductor L, which is inductively coupled to the smoothing inductor L2 of the filter network.

The correct collector voltage is, however, achieved only within a relatively small voltage range for the unregulated primary voltage source. If the output voltage of this source is varying considerably, the driver transistor will either be biased to a too low collector voltage and thereby be unable to render the switching transistor Q4 fully conducting, or be supplied with an unnecessary high DC current. In the first case the power loss and the voltage drop of the switching transistor will increase whereas in the latter case increased power will be dissipated in the driver transistor Q2.

Thus, it is an object of the present invention to provide switching means of the present kind with improved efficiency, and this is achieved in a switching apparatus where said switching transistor is series connected with a parallel connection of an inductance and a rectifier diode, conducting in the same direction as the switching transistor; said latter series connection being connected in parallel with aid series connection of the driver transistor and the load resistor.

Further features and advantages of an apparatus according to the invention will appear from the following description with reference to the accompanying drawings, where:

Figures 1, 2, 3, 4:
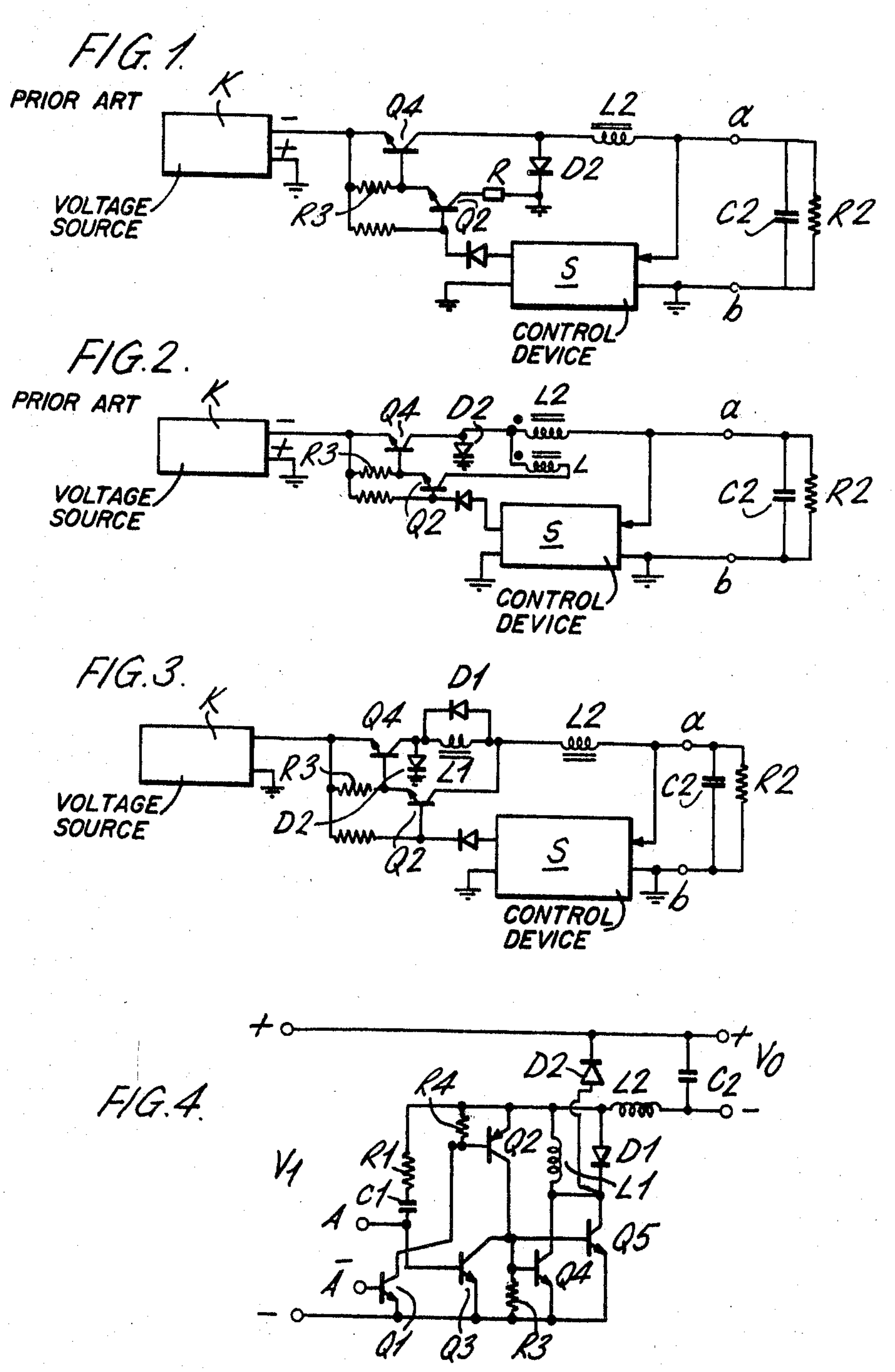
FIG. 1 PRIOR ART, FIG. 2 PRIOR ART, FIG. 3, FIG. 4
FIG. 1 shows a circuit diagram of a conventional embodiment of switching means of the present type.
FIG. 2 shows a circuit diagram of another embodiment of conventional switching means.
FIG. 3 shows a corresponding circuit diagram of an embodiment according to the invention.
FIG. 4 shows a more detailed circuit diagram of another embodiment according to the invention.

The embodiment of the invention shown in FIG. 3, comprises a driver transistor Q2 of the same kind (NPN or PNP) as the switching transistor Q4 and a load resistor R3, these components being interconnected to form an emitter follower with the load resistor R3 inserted in the input circuit of the switching transistor Q4.

Switching means according to the invention may, however, as shown in FIG. 4, include a driver transistor Q2 which is complementary to the switching transistors Q4, Q5, and a load resistor R3 inserted in the collector circuit of the driver transistor Q2, this resistor also being included in the input circuit of the switching transistors. In this case a certain voltage gain is obtained by means of the driver transistor Q2, thus allowing the application of lower level control pulses than in the previous case.

However, no matter how the driving circuit is arranged, the parallel connection of the inductance L1 and the rectifier diode D1, as shown in FIG. 3 and 4, effects considerably smaller variations of the voltage across the driver circuit than the voltage variations of the primary voltage source K. With an input voltage above normal and the switching transistor Q4 conducting, the current will increase faster in the filter inductor L2 than in the inductance L1, as the current through the diode D1 will increase with only a slight increase of the voltage drop across the parallel connection. When the switching transistor Q4 becomes nonconducting, the current through diode D1 will decrease successively and nearly linearly to zero. This operation is of course due to the special current-voltage characteristic of the diode D1, which is advantageous for the present purpose, and to the current inertia of the parallelly connected inductance L1. Thus, only small losses will occur in the diode D1, while the collector-to-emitter voltage of the driver transistor is maintained essentially constant in spite of considerably voltage variations of the primary source.

To achieve a further decrease of the losses in the switching means it is a further object of the invention to accomplish faster transitions between the conducting and the nonconducting states of the switching transistor Q4, Q5.

Conventionally such transitions are effected either by rendering the driver transistor Q2 conducting, respectively nonconducting or by short-circuiting, respectively opening a short-circuiting of, the load resistor R3.

In switching means according to the invention, however, to control device S is both operative to make the driver transistor nonconductive and to short circuit the load resistor when the switching transistor is to be made nonconductive, an to effect the reverse process when the switching transistor is to be made conductive. During these processes the driver transistor Q2 is preferably made nonconductive before the short-circuiting of the load resistor R3, and conducting before the opening of said short-circuiting. For the actuation of said switching actions the control device S may, according to the invention, comprise a short-circuiting transistor, the output of which is connected across the load resistor, and the input of which is supplied with control pulses complementary to the control pulses supplied to the driver transistor, and a feedback network, which is inserted between the input of the short-circuiting transistor and output side of the parallel connection of the diode and the inductance.

However, to allow a low control pulse level the control device S preferably further comprises a control transistor which is complementary to the driver transistor and the output of which is connected to the input of the same, said control transistor is operative to transfer the control pulses to the driver transistor.

Complementary control pulses are supplied to the input terminals A and A respectively. The electrical state of the network R1, C1 changes as soon as the current increase through Q4 is reduced, thus securing both the right activation for the transistor Q3 and a low working current of the same.

By the combined effect of the two above processes a very short transition time between the respective states of the switching transistor is achieved. The power losses in this transistor are also considerably diminished, as both current and voltage will have appreciable magnitudes during a large part of the transition time. In addition also the probabilities of a second break down in all transistors are reduced, as they are in the critical transition state for such a brief time where such break down usually takes place. This means an increased working reliability.

For comparison the respective switching means of FIG. 1, 2 and 3 will now be described in detail.

Each of the above FIGS. shows switching means, comprising a switching transistor Q4 and a driver transistor Q2, which drives switching transistor Q4 alternatively to a conducting or a nonconducting state by means of a load resistor R3 in its emitter circuit, this resistor R3 also being part of the input circuit of the switching transistor Q4.

The switching transistor alternately connects the primary voltage source K to, and disconnects the same from, a conventional filter network L2, C2, which feeds current to a load, represented by the resistor R2. This operation of the switching transistor Q4 is controlled by the control device S, which emits control pulses for the actuation of the driver transistor in accordance with the magnitude of the voltage between the output terminals *a,b*. The control device S may, for instance, comprise a comparator (not shown) cooperating with a Schmidt trigger (not shown), so that the comparator compares the regulated output voltage with a reference voltage, which may be fixed or adjustable, and actuates the Schmidt trigger to release a control pulse each time the output voltage falls below the reference voltage level and to finish the control pulse when the output voltage rises above the reference voltage level. However, when the current from the primary source K is cut off, the current flow through the load R2 may continue due to the inductive action of the inductor L2 and because a closed current loop is provided through the rectifier diode D2.

Thus, the three above versions of the present switching means in FIG. 1—3 are functioning in the same way, but the embodiment in FIG. 3, which is designed according to the invention, allows, as stated above, a higher efficiency, especially with great variations of the output voltage from the primary source K. The parallel connection of the inductance L1 and the rectifier diode D1 makes the voltage, and the current through, the drive transistor Q2 and its load resistor R3 more independent of the voltage variations.

FIG. 4 shows more explicitly the design of a control device according to the invention. In this Figure there is shown two parallel connected switching transistors, Q4 and Q5, which are driven by a driver transistor Q2, with a load resistor R3 in the collector circuit. Here the driver transistor is of complementary kind (PNP) with respect to the switching transistors Q4, Q5, which in this case are of the NPN type. A transistor Q3 is connected in parallel with the load resistor R3 in its emitter-collector circuit, and is supplied with control pulses over the terminal A which is attached to the base of the transistor Q3.

A feedback network consisting of a series connection of a capacitor C1 and a resistor R1, effects a feed back of the potential on the output side of the characteristic parallel connection of the diode D1 and the inductance L1, to the input terminal A.

A further transistor Q1 controls the driver transistor Q2 by means of a load resistor R4, this transistor Q1 receiving control pulses, complementary to the above control pulses, over an input terminal A, connected to the base of the transistor Q1. All the transistors are supplied with working voltage and current from the primary voltage source 1, so that no auxiliary voltage sources are needed.

The switching means of FIG. 4 function in such a way that the transistor Q1 is made conducting and the transistor Q2 nonconducting when the mutually complementary control pulses are supplied to the terminals A and A, respectively. The transition process in the transistor Q3 will, however, be somewhat delayed due to the effect of the feedback network C1, R1, whereby the driver transistor Q2, may be transferred more rapidly to the fully conducting state because the current fed to this transistor may initially pass through the still conducting transistor Q3, independently of the load resistor R3.

In the same way Q2 is transferred to the nonconducting stage before Q3 becomes fully conductive by the end of the control pulses. Thus, the transition of the driver transistor Q2 is not hampered by the short and open-circuiting of the load resistor R3.

By means of this double control process the transition between the respective stable states of the switching transistors Q4, Q5 will be very fast, and in practice the transition time will be in the order of nanoseconds. This will, as explained above, contribute to a further decrease of the power losses and an increased working reliability for the switching means according to the invention.

I claim:

1. Switching means for the regulation of a DC voltage between a pair of output terminals, comprising:

at least one switching transistor connected between said terminals and said DC voltage and having an input circuit, at least one driver transistor connected to said DC voltage for alternately switching said switching transistor between a conducting and nonconducting state, a load resistor in said input circuit, a control device for actuating said driving transistor to emit control pulses in accordance with the voltage variations between said output terminals, an inductance and a rectifier diode parallelly interconnected with one another, said diode conducting current in the same direction as said at least one switching transistor, said parallel connected elements are connected in series with said at least one switching transistor, and said switching transistor, said inductance and said rectifier diode are parallelly connected with said serially connected driver transistor and said load resistor.

2. Switching means as claimed in claim 1, wherein said control device is operative to make said driver transistor nonconductive and to short circuit said load resistor when said at least one switching transistor is made nonconductive, and to effect the reverse operation when said at least one switching transistor is made conductive.

3. Switching means as claimed in claim 2, wherein the control device is operative to make said at least one driver transistor nonconductive before the short-circuiting of said load resistor, and to make said at least one driver transistor conductive before said short-circuiting.

4. Switching means as claimed in claim 3, wherein said control device comprises a short-circuiting transistor having an output which is connected across said load resistor and an input which is supplied with control pulses complementary to the control pulses supplied to said at least one driver transistor, and further comprising a feedback network inserted between the input of the short-circuiting transistor and the output side of said parallel connection of said diode and said inductance.

5. Switching means as claimed in claim 4, wherein the control device further comprises a control transistor, which is complementary to said at least one driver transistor and the output of which is connected to the input of said at least one driver transistor, said control transistor is operative to transfer said control pulses to said at least one driver transistor.